United States Patent
Accolla

(10) Patent No.: US 10,357,417 B1
(45) Date of Patent: Jul. 23, 2019

(54) RUBBER COATING

(71) Applicant: Raymond William Accolla, Suffern, NY (US)

(72) Inventor: Raymond William Accolla, Suffern, NY (US)

(*) Notice: Subject to any disclaimer, the term of this patent is extended or adjusted under 35 U.S.C. 154(b) by 0 days.

(21) Appl. No.: 15/915,790

(22) Filed: Mar. 8, 2018

(51) Int. Cl.
*A61G 17/04* (2006.01)
*C09D 121/00* (2006.01)
*C08C 19/08* (2006.01)

(52) U.S. Cl.
CPC .......... *A61G 17/042* (2016.11); *C09D 121/00* (2013.01); *C08C 19/08* (2013.01)

(58) Field of Classification Search
CPC .............. A61G 17/007; A61G 17/042; A61G 17/0076; E04H 13/00; C09D 121/00; C09D 117/00; C08C 19/08
USPC ............... 27/19, 35, 3, 6; 52/128, 134, 140; 427/421.1; 428/440, 465, 492
See application file for complete search history.

(56) References Cited

U.S. PATENT DOCUMENTS

| | | | | |
|---|---|---|---|---|
| 1,617,588 A * | 2/1927 | Geer | ...................... | B32B 15/06 156/338 |
| 1,853,747 A * | 4/1932 | Rosenqvist | .............. | C25D 1/00 204/275.1 |
| 2,265,263 A * | 12/1941 | Brookins | ............... | A61G 17/00 27/3 |
| 3,130,520 A * | 4/1964 | Newman, Jr. | ........... | E04H 13/00 52/135 |
| 3,787,545 A * | 1/1974 | Chandler et al. | ....... | E04H 13/00 264/135 |
| 4,128,981 A * | 12/1978 | Juba | ........................ | E04H 13/00 156/333 |
| 4,448,826 A * | 5/1984 | Davidian | ................ | A61G 17/04 27/11 |
| 4,520,043 A * | 5/1985 | Davidian | ............. | A61G 17/042 27/6 |
| 4,827,581 A * | 5/1989 | Davidian | ................ | A61G 17/04 27/19 |
| 5,115,607 A * | 5/1992 | Pirozzoli | ............... | E04H 13/006 52/134 |
| 5,140,728 A * | 8/1992 | Chandler | ................ | A61G 17/04 264/250 |
| 5,157,817 A * | 10/1992 | Davidian | ............ | B28B 19/0046 27/35 |
| 5,666,705 A * | 9/1997 | Semon | .................... | A61G 17/00 27/19 |

(Continued)

OTHER PUBLICATIONS

The attached article from the Massachusetts Institute of Technology can be found at the following web address https://tatacenter.mit.edu/portfolio/devulcanization-of-waste-rubber-for-reuse-in-new-tires/.

*Primary Examiner* — William L Miller
(74) *Attorney, Agent, or Firm* — Michael J. Feigin, Esq.; Feigin and Fridman LLC

(57) ABSTRACT

Rubber Coating casket liner will be fitted within the perimeter of the inside of the casket (10). The Rubber Coating casket tray will be placed on the slab of a mausoleum and the casket will rest inside the perimeter of the tray (18). The Rubber Coating liquid will be used as a filler and a sealant. The spray will be used to seal the outside of the concrete burial vault (20), from water entering inside. The coating spray used in the inside will prevent decomposed human body fluids from escaping out of the vault into the ground.

7 Claims, 6 Drawing Sheets

(56) References Cited

U.S. PATENT DOCUMENTS

| | | | | |
|---|---|---|---|---|
| 6,253,503 B1 * | 7/2001 | Flood | ............... | E04H 13/00 27/19 |
| 7,197,794 B2 * | 4/2007 | Davis | ............... | A61G 17/04 27/19 |
| 7,767,722 B2 | 8/2010 | Fan | | |
| 8,578,574 B1 * | 11/2013 | Smith | ............... | A61G 17/047 27/35 |
| 2003/0182779 A1 * | 10/2003 | Sevey | ............... | A61G 17/00 27/19 |

* cited by examiner

RUBBER COATING

BACKGROUND

In the funeral industry the methods for preventing fluids from leaving a casket leave room for improvement as these fluids are still finding their way into the environment causing contamination. The purpose of Rubber Coating is to prevent the leaking of human decomposed body fluids. The Rubber Coating casket liners, trays, filler and sealant improves and preserves the quality of the product that is the casket, the mausoleum, and the burial vault.

SUMMARY

Rubber Coating is a liquid rubber manufactured from old worn out vehicle tires. This "green" invention takes advantage of used tires to create a very useful and versatile rubber liquid used in making Funeral Casket liners, Casket trays, and a Rubber Coating spray for concrete burial vaults.

ADVANTAGES

Rubber Coating is waterproof and UV-Resistant when applied to any surface. Rubber Coating will be made according to its use. It can be made into a thick sticky liquid rubber when squeezed through a specially shaped mold and cooled then it quickly hardens in the mold to take its shape. The product prevents separation and cracking. It will also be a filler and a sealant. Rubber Coating will also be made into five different textures: Smooth, Medium, Coarse, Rough, Grainy. The product is environmentally safe. Rubber Coating has been formulated to provide long lasting protection because of its excellent flexibility in all temperatures. Rubber casket liners and casket rubber trays will prevent human decomposed body fluids from leaking into our environment thus preventing further contamination of our grounds and our water. The sealant may be used in a number of different applications while also helping to keep used rubber tires out of landfills, lakes, and rivers.

DRAWINGS—FIGURES

In the drawings, closely related figures have the same number but different alphabetical suffixes.

DRAWINGS—REFERENCE NUMERALS

10—Rubber liner
20—Sealant/Filler Spray
24—Sealant/Filler Paint

DETAILED DESCRIPTION

Figure 1A:
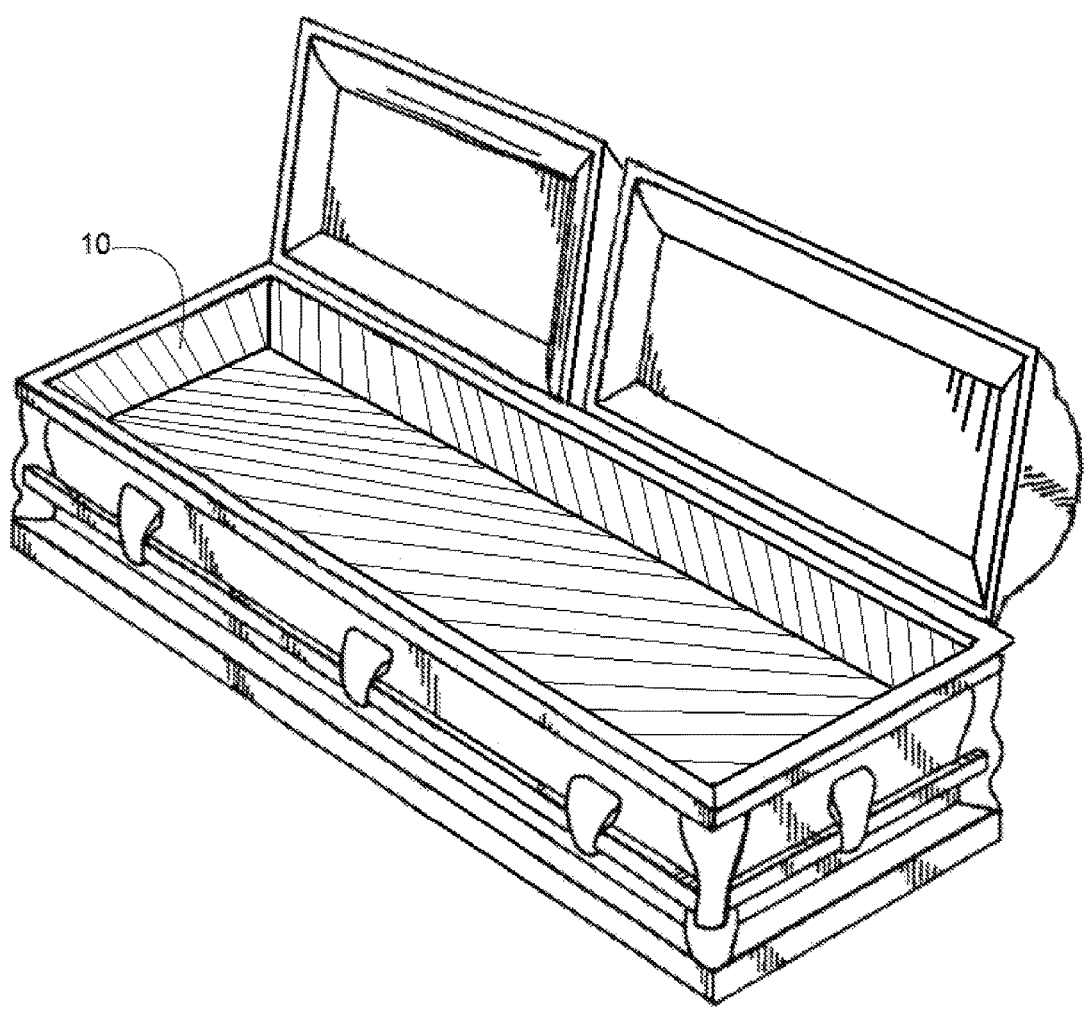
FIGS. 1A to 1D show the Rubber Coating casket liner. How it fits inside a casket, and how it looks on its own before being inserted into a casket.
Figure 1B:
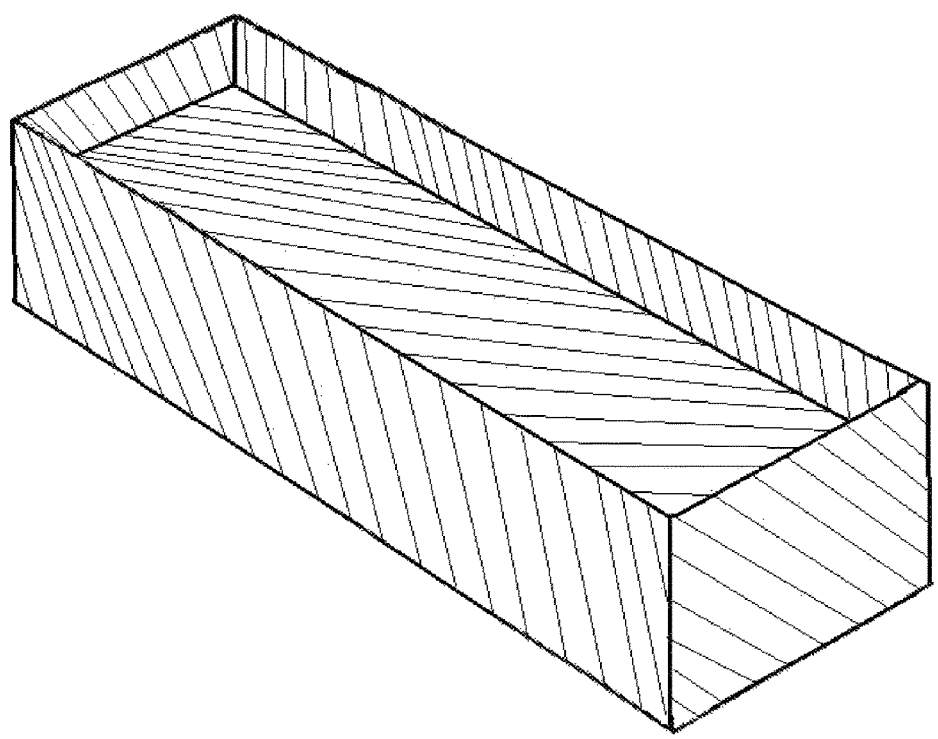
Figure 1C:
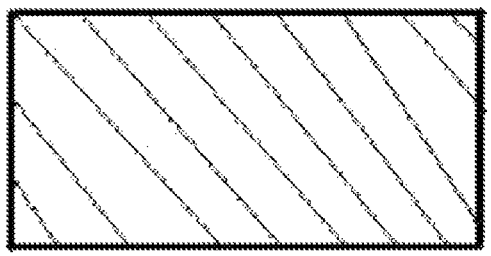
Figure 1D:
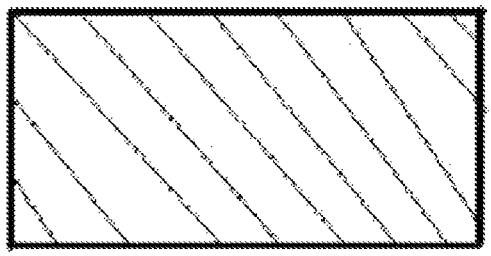
Figure 2A:
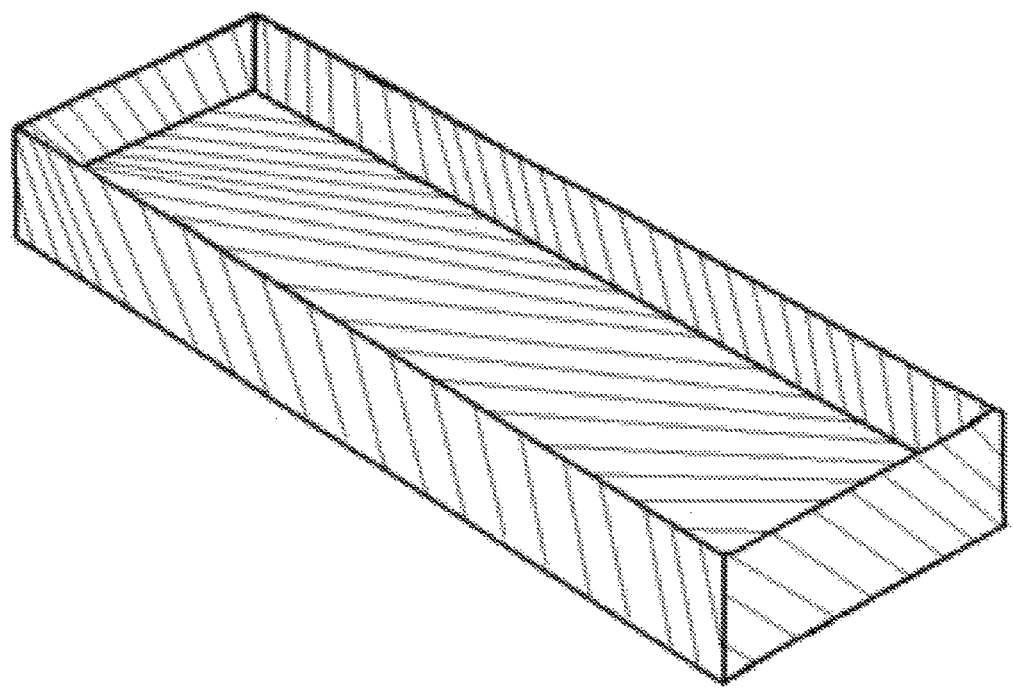
FIGS. 2A to 2D show the Rubber Coating casket tray from different angles.
Figure 2B:
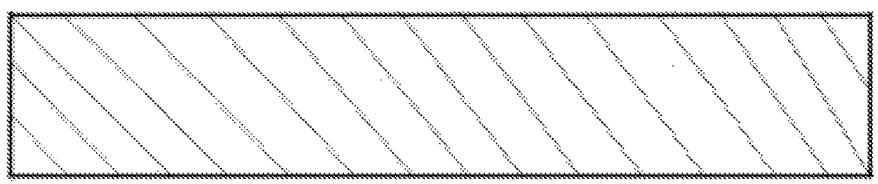
Figure 2C:
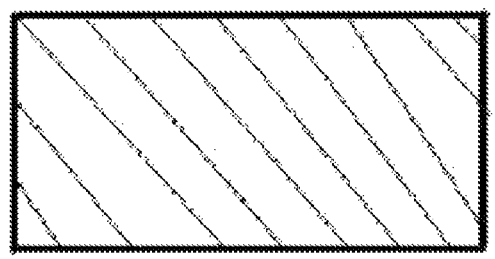
Figure 2D:
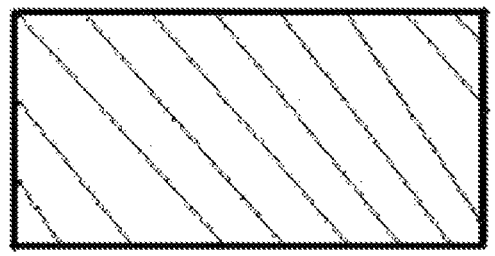
Figure 3A:
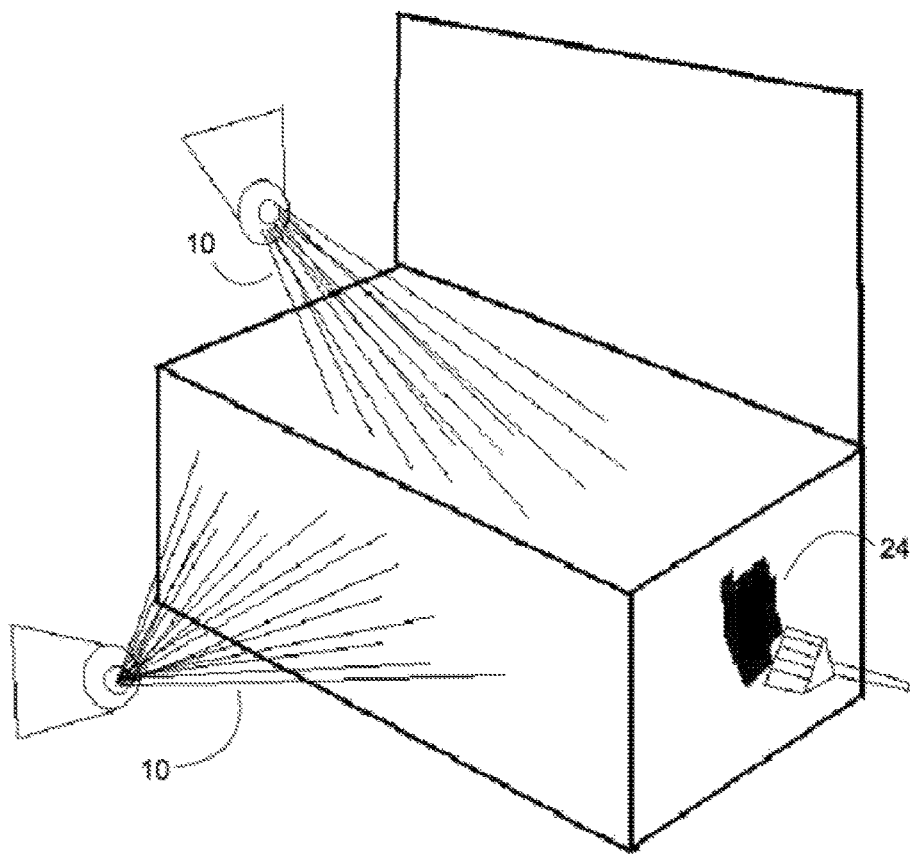
FIG. 3A shows how the sealant and liner can be applied to a concrete burial vault, either by spray or painting with a brush
Figure 3A:
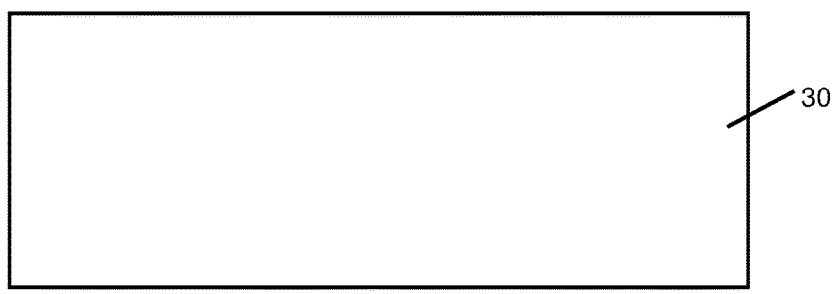

Used tire rubber is put through a special process to create the liquid rubber. (See attached form from The Tata Center, Massachusetts Institute of Technology). Chemical devulcanization is used in the process to revert the tire rubber structure and its characteristics back to those of a liquid rubber thus allowing it to be reformulated into a new product. The liquid rubber is poured into a mold and allowed to dry, and take its form to produce a liner (FIG. 1B) and a casket tray (FIG. 2A). Rubber Coating will be formulated and made into five different textures. The product will be used to manufacture casket liners, casket trays, and a liquid spray for burial concrete vaults (FIG. 3A). Rubber Coating Casket Liner 10 (FIG. 1A) will stop the breakdown of human decomposed fluids from leaking out of the casket. The Rubber Coating casket tray will be used in mausoleums and placed on a slab 30 thereof. The spray for concrete burial vaults 20 (FIG. 3A), or used as a paint 24 (FIG. 3A), will prevent water from entering and mixing with human decomposed body fluids. It will prevent these fluids from leaking out of the concrete vault into the earth. It will also prevent any further contamination of the grounds and water. A mausoleum slab 30 is shown in FIG. 3A.

The invention claimed is:

1. A method of protecting a body in a mausoleum, comprising:
    producing a casket liner from chemical devulcanization of rubber, said rubber sourced from tires and said casket liner fitted within a perimeter of an inside of a casket;
    producing a casket tray from said rubber sourced from tires and placing said casket tray on a slab of said mausoleum;
    placing said casket within a perimeter of said casket tray;
    creating a sealant on an outside of a concrete burial vault with said rubber sourced from said tires.

2. The method of claim 1, wherein said sealant is formed by spraying said rubber sourced from tires after said chemical devulcanization thereof.

3. A combination of devices including:
    a casket;
    a liner fitted within a perimeter of an inside of said casket such that at least an interior side of said casket is fitted with said liner;
    wherein said liner is liquid rubber which is formed from chemical devulcanization of rubber sourced from vehicle tires;
    a casket tray supporting said casket, said casket tray produced from said chemical devulcanization of rubber sourced from vehicle tires, said casket tray placed on a slab of a mausoleum; and
    a sealant on an outside of a concrete burial vault, said sealant produced from said chemical devulcanization of rubber sourced from vehicle tires.

4. The casket of claim 3, wherein said liquid rubber is placed in a spray can.

5. The casket of claim 4, wherein an entirety of said interior side of said casket is covered with said liner.

6. The casket of claim 3, wherein fluids from a body within said casket are held within said casket by said liner.

7. The combination of devices of claim 3 wherein said sealant is formed by spraying said rubber sourced from tires after said chemical devulcanization thereof.

* * * * *